(12) United States Patent
Adimatyam et al.

(10) Patent No.: US 8,776,122 B2
(45) Date of Patent: Jul. 8, 2014

(54) UNIFIED RECORDING LISTING ACROSS MULTIPLE DEVICES

(75) Inventors: Venkata S. Adimatyam, Irving, TX (US); Srikrishnan Ganesan, Chennai (IN); Angel Cordero, Chatham, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 540 days.

(21) Appl. No.: 12/648,125

(22) Filed: Dec. 28, 2009

(65) Prior Publication Data

US 2011/0162009 A1   Jun. 30, 2011

(51) Int. Cl.
| | |
|---|---|
| H04N 5/445 | (2011.01) |
| H04N 7/173 | (2011.01) |
| H04N 21/436 | (2011.01) |
| H04N 21/466 | (2011.01) |
| H04H 20/63 | (2008.01) |
| H04L 29/08 | (2006.01) |

(52) U.S. Cl.
CPC ......... *H04N 21/436* (2013.01); *H04N 21/4661* (2013.01); *H04H 20/63* (2013.01); *H04L 29/08936* (2013.01)
USPC .............. 725/40; 725/48; 725/49; 725/133

(58) Field of Classification Search
USPC ........................ 725/40, 48, 49, 133
See application file for complete search history.

(56) References Cited

U.S. PATENT DOCUMENTS

| | | | |
|---|---|---|---|
| 7,873,259 B2 * | 1/2011 | Hamzy et al. ............... 386/241 |
| 2006/0161635 A1 * | 7/2006 | Lamkin et al. .............. 709/217 |
| 2007/0143776 A1 * | 6/2007 | Russ ............................. 725/14 |
| 2009/0010610 A1 * | 1/2009 | Scholl et al. ................. 386/68 |
| 2010/0005496 A1 * | 1/2010 | Ellis et al. ................... 725/87 |
| 2010/0043030 A1 * | 2/2010 | White .......................... 725/58 |

* cited by examiner

*Primary Examiner* — Pankaj Kumar
*Assistant Examiner* — Franklin Andramuno

(57) ABSTRACT

A method may include requesting aggregated index information relating to media content stored on a least two digital video recorder (DVR) devices. The aggregated index information is received in response to the request. The aggregated index information includes a number of content entries, each entry including location information identifying a DVR device on which the associated media content is stored. A listing of the media content is displayed based on the aggregated index information.

16 Claims, 9 Drawing Sheets

| DVR id | Address | Type | Name | Title | Description | Date | Status |
|---|---|---|---|---|---|---|---|
| Living Room | sector 2 | Movie | | A Few Good Men | In this dramatic courtroom thriller, Lt. Daniel Kaffee, a Navy lawyer who has never seen the inside of the courtroom..... | 10/18/09 | Watched |
| Living Room | sector 4 | TV Show | Private Practice | Pushing the Limits | Addison, Sam and Cooper treat the sick child of a homeless teen mother they met while volunteering. Meanwhile Violet has trouble relating... | 10/22/09 | Watched |
| Living Room | sector 5 | TV Show | Smallville | Kandor | Jor-El mysteriously arrives at the Kent farm searching for his son, Kal-El, but meets Chloe instead. Convinced the blur is Jor-El, Zod enlists... | 11/06/09 | Partially Watched: 22:43 |
| Living Room | sector 7 | TV Show | Grey's Anatomy | New History | Owen recruits Dr. Teddy Altman, a former Iraqi veteran, as the new cardiothoracic surgeon. Cristina questions her abilities in the E.R. and relationship with... | 11/12/09 | Unwatched |

| DVR id | Address | Type | Name | Title | Description | Date | Status |
|---|---|---|---|---|---|---|---|
| Living Room | sector 2 | Movie | | A Few Good Men | In this dramatic courtroom thriller, Lt. Daniel Kaffee, a Navy lawyer who has never seen the inside of the courtroom..... | 10/18/09 | Watched |
| Living Room | sector 4 | TV Show | Private Practice | Pushing the Limits | Addison, Sam and Cooper treat the sick child of a homeless teen mother they met while volunteering. Meanwhile Violet has trouble relating... | 10/22/09 | Watched |
| Living Room | sector 5 | TV Show | Smallville | Kandor | Jor-El mysteriously arrives at the Kent farm searching for his son, Kal-El, but meets Chloe instead. Convinced the blur is Jor-El, Zod enlists... | 11/06/09 | Partially Watched: 22:43 |
| Living Room | sector 7 | TV Show | Grey's Anatomy | New History | Owen recruits Dr. Teddy Altman, a former Iraqi veteran, as the new cardiothoracic surgeon. Cristina questions her abilities in the E.R. and relationship with... | 11/12/09 | Unwatched |

FIG. 4

UNIFIED RECORDING LISTING ACROSS MULTIPLE DEVICES

BACKGROUND

Video recorders that interface with set top boxes to record programming have become increasingly common in many households. Using a conventional video recorder, a user may select a program from a program guide and record the program. In such a scenario, the user may later view a list of programs that were recorded and select one of the recorded programs for viewing.

More recent video recorder systems have extended this concept by enabling users of other, non-recording, set-top boxes to see and play back content that was originally recorded on a video recorder.

BRIEF DESCRIPTION OF THE DRAWINGS

FIG. 4 illustrates a structure of an exemplary index for storing content information in the DVRs of FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to devices, methods, and systems for facilitating the retrieval and display of content information from a number of digital video recorders (DVR) or other content storing devices. In some implementations, a set-top box (STB) (which may or may not include a DVR), a display device (e.g., a television), or another electronic device may request information regarding content stored on multiple DVR devices associated with a user of the requesting device.

The requested content information may include various details relating to the multimedia content, such as type (television, video on demand (VOD), video games, photos, music, etc.), genre of programming, (e.g., kids, action, drama, comedy, sports, etc.), program names, etc. Furthermore, consistent with embodiments described herein, the collected information may further include device identification information indicating a name/location of the device that stores the content.

The requesting device may receive the requested information and may present the information to the user in a variety of manners, including a unified listing that displays a listing of content from across all linked devices that is available for viewing. For example, a user, via any associated or "linked" STB, may view a unified listing of content stored on two or more different DVR devices. The content may be further filtered based on various criteria, such as genre, date, type, device name, status of user interaction with content (unwatched content/partially watched/watched content), etc or sorted based on criteria, such as alphabetically, freshness (date of recording/creation—reverse chronological or chronological order) or based on attributes of the content (size).

As used herein, the terms "viewer" and/or "user" may be used interchangeably. Also, the terms "viewer" and/or "user" are intended to be broadly interpreted to include a user device, a DVR, a STB, and/or a television or a user of a user device, DVR, STB, and/or television.

Figure 1:
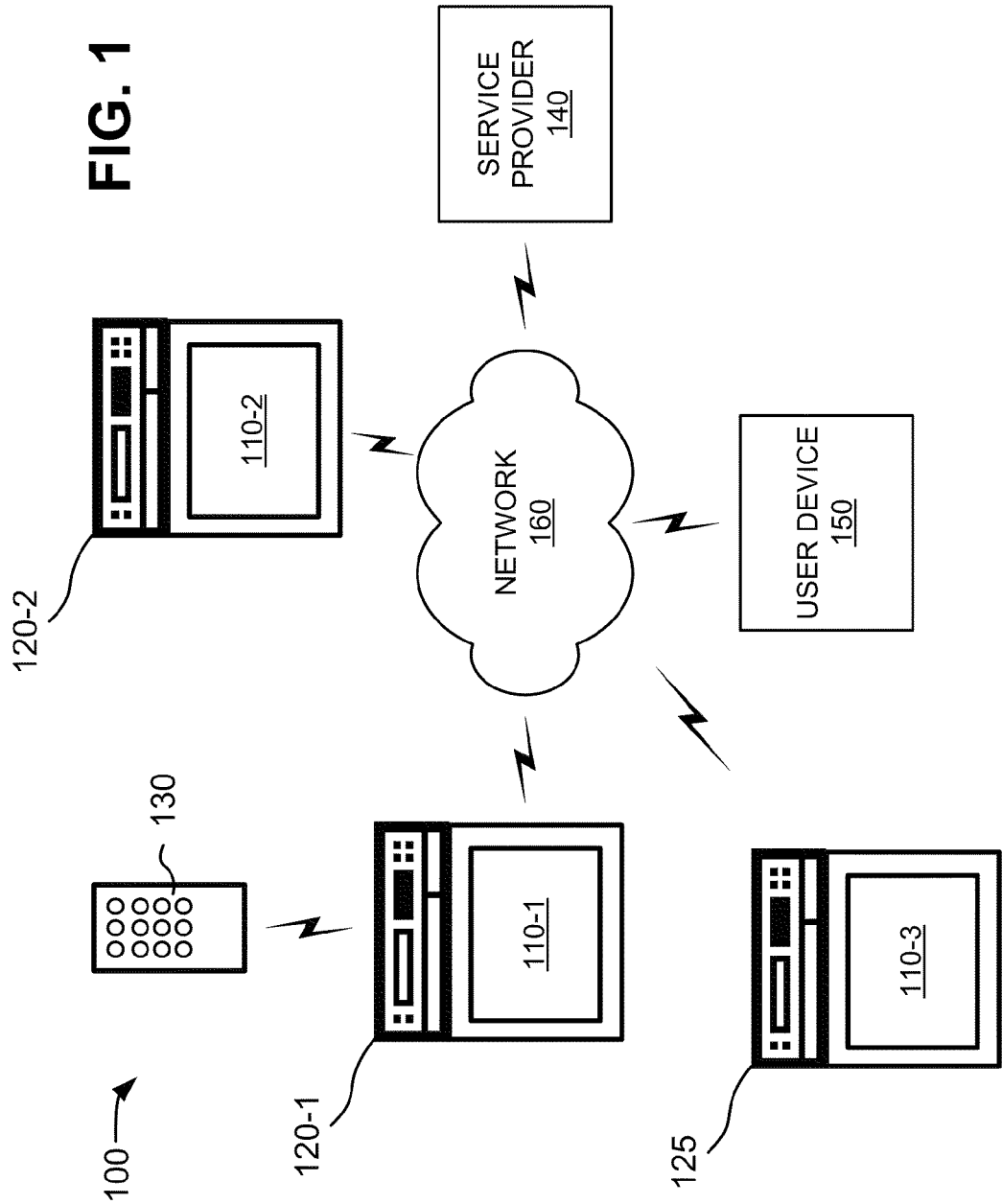
FIG. 1 depicts a diagram of an exemplary network in which systems and methods described herein may be implemented.

FIG. 1 is a diagram of an exemplary network 100 in which systems and methods described herein may be implemented. As illustrated, network 100 may include televisions (TVs) 110-1 to 110-3 (collectively "televisions 110" and individually "television 110"), DVRs 120-1 and 120-2 (collectively "DVRs 120" and individually "DVR 120"), a STB 125, a remote control 130, a service provider 140, and a user device 150 interconnected by a network 160. Components of network 100 may interconnect via wired and/or wireless connections. Although three televisions 110, three DVRs 120, and one STB 125, remote control 130, service provider 140, user device 150, and network 160 have been illustrated in FIG. 1 for simplicity. In practice, there may be more televisions 110, DVRs 120, STBs 125, remote controls 130, service providers 140, user devices 150, and/or networks 160. Also, in some instances, one or more of the components of network 100 may perform one or more functions described as being performed by another one or more of the components of network 100.

Televisions 110 may include any suitable display device capable of displaying video content provided by DVRs 120 or STB 125, and/or content provided by other devices (e.g., a digital video disk (DVD) player, a video camera, a home media player, etc., not shown) connected to television 110.

DVRs 120 and STB 125 may include devices that receive television programming (e.g., from service provider 140), and provide the television programming to television 110 or another device. DVRs 120 and STB 125 may allow users to alter the programming provided to television 110 based on a signal (e.g., a channel up or channel down signal, etc.) from remote control 130 and/or user device 150. Furthermore, DVRs 120 may record video in a digital format to a disk drive or other memory medium within DVRs 120. In one exemplary implementation, features of DVRs 120 and/or STB 125 may be incorporated directly within televisions 110. Consistent with implementations described herein, DVRs 120 and STB 125 may be configured to display content stored on another one of DVRs 120. This feature may be referred to as a "multi-room DVR." Moreover, DVRs 120 and STB 125 may receive information from television 110, service provider 140, and/or user device 150 in the manner described below. It should be understood that STB 125 may include any in device capable of viewing content stored by DVRs 120, such as a set-top box, a DVR, a PC, a gaming console, a media playing device, etc.

Remote control 130 may include a device that allows a user to control programming and/or content displayed on television 110 via interaction with DVRs 120 and/or STB 125. Furthermore, remote control 130 may facilitate interaction with various television viewing history features associated with DVRs 120 and/or STB 125.

Service provider 140 may include one or more server entities, or other types of computation or communication devices, that gather, process, search, and/or provide information in a manner described herein. In one implementation, service provider 140 may include a server (e.g., a computer system or an application), a cable head-end, or a broadcaster capable of providing content (e.g., TV programming, movies, on-demand services, live television, news feeds, blog feeds, widgets, applications, etc.), advertisements, instructions, codes, encryption keys, and/or other information associated with products and/or services, etc., to DVRs 120 and/or STB 125. In some implementations, service provider 140 may be configured to receive information from DVRs 120, STB 125, televisions 110, or user device 150 in the manner described below.

User device 150 may include a mobile telephone (e.g., a cell phone), a smart phone (e.g., that may combine a cellular radiotelephone with data processing and data communications capabilities), a personal digital assistant (PDA) (e.g., that can include a radiotelephone, a pager, Internet/intranet access, etc.), a laptop or notebook computer, a personal computer, an ultra mobile personal computer (UMPC), a netbook, or other types of computation or communication devices, threads or processes running on these devices, and/or objects executable by these devices. In one implementation, user device 150 may include any device (e.g., an Internet Protocol (IP)-based device) that is capable of accessing service provider 140, DVRs 120 and/or STB 125, either directly or indirectly, via network 160. In other implementations, user device 150 may be configured to interact with DVRs 120, STB 125, and/or television 110, via a local network different than network 160 (e.g., a home wired or wireless network).

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

Figure 2:
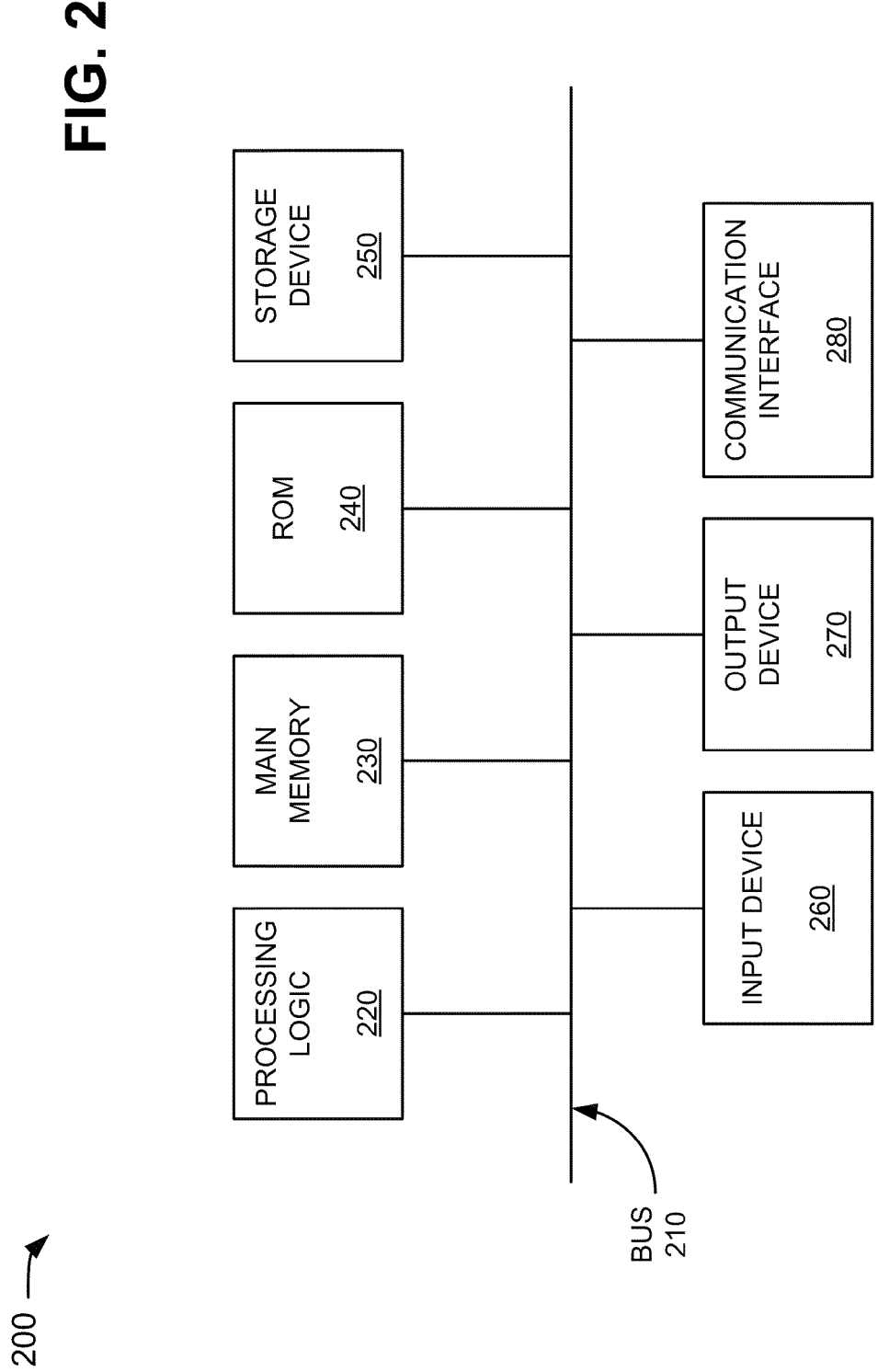
FIG. 2 illustrates exemplary components of a digital video recorder (DVR), set-top box (STB), television, service provider, and/or user device of the network depicted in FIG. 1.

FIG. 2 is an exemplary diagram of a device 200 that may correspond to any of DVRs 120, STB 125, service provider 140, and/or user device 150. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 130, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 160.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
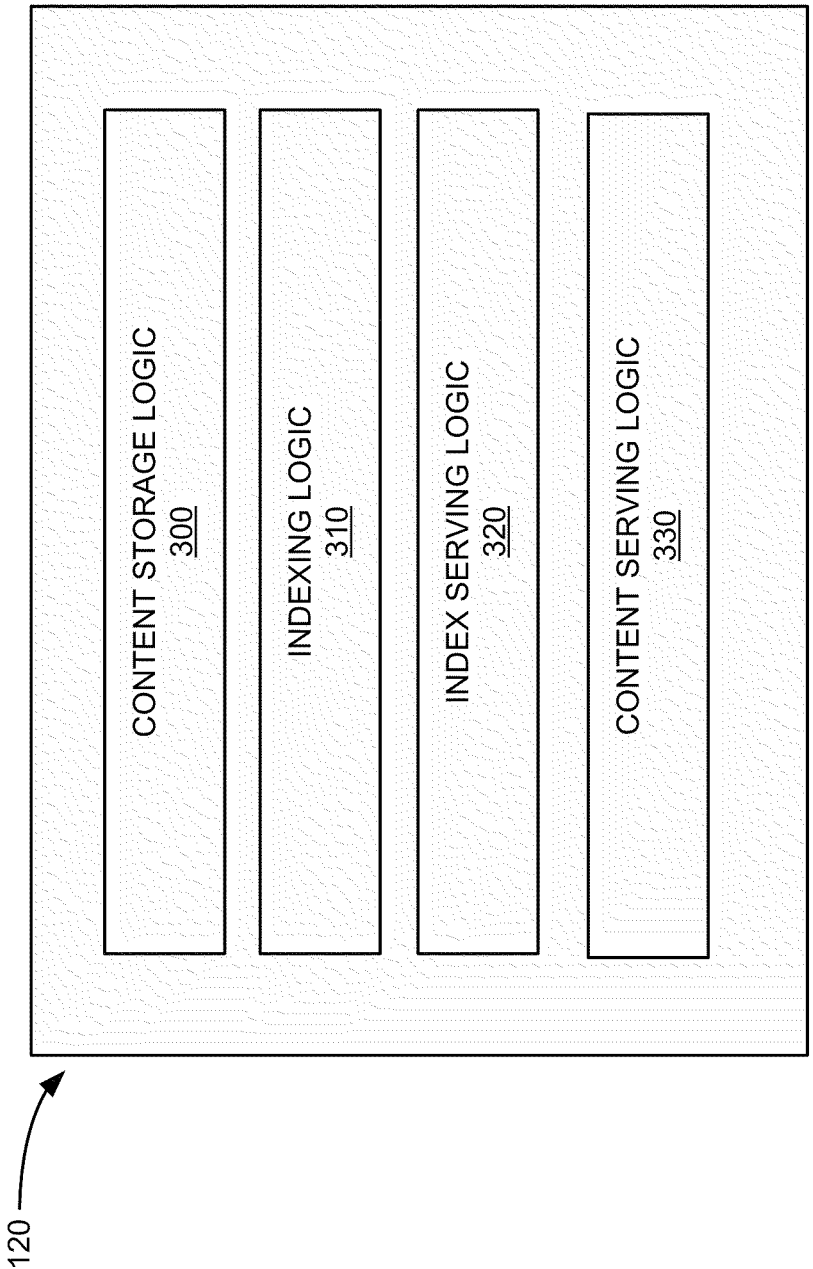
FIG. 3 illustrates an exemplary functional block diagram of components implemented in the DVRs of FIG. 1.

FIG. 3 is an exemplary functional block diagram of components implemented in DVRs 120 of FIG. 1. In an exemplary implementation, all or some of the components illustrated in FIG. 3 may be stored in memory 230. For example, referring to FIG. 3, memory 230 may include content storage logic 300, indexing logic 310, and index serving logic 320 and content serving logic 330. In addition, various logic components illustrated in FIG. 3 may be implemented by processing logic 220 executing one or more programs stored in memory 230. In some implementations, one or more components of FIG. 3 may be implemented in other devices, such as service provider 140 or TV 110.

Content storage logic 300 may include may include logic configured to receive and store content in storage device 250 of DVR 120. For example, content storage logic 300 may be configured to record video programming or other media content (e.g., applications, widgets, music, video-on-demand (VOD) content, pay-per-view (PPV) content, etc.) received from service provider 140. Content storage logic 300 may be further configured to store media content from user device 150, such as music and/or videos stored on a home personal computer (PC).

The term "widget" generally refers to a software application, typically small in size, configured to provide a defined function or type of information. Exemplary widgets may include weather widgets for tracking weather conditions, stock widgets for tracking financial stocks or markets, news widgets, for facilitating the display and presentation of news items, etc. Provided widgets may retrieve related information from remote sources via, for example, network 160.

Indexing logic 310 may include logic configured to store information relating to the content stored by content storage logic 300. This information may generally referred to as "an index." Consistent with embodiments described herein, indexing logic 310 may extract and store information (also referred to as metadata) for content items (e.g., DVR recordings, photos, videos, music files, etc.) stored by content storage logic 300. The extracted information may include media item details, such as content type, title, description, location or address, viewing status information, etc. In this information, each linked DVR 120 may be provided with a DVR identifier, such as a number or alphanumeric identifier. In some instances, the DVR identifiers may include descriptive names for each linked DVR, indicative of the DVRs location in the residence, such as "family room," "master bedroom," etc.

In addition, two or more of DVRs 120 or STBs 125 may be configured to provide multi-room recording or multi-room DVR. Multi-room DVR refers to a feature in which a user may watch a portion of recorded content in one room (e.g., via a first DVR 120). The user may then stop playback of the programming content on the first DVR 120 or STB 125 and, at some point in the future, continue playback of the programming on a second linked DVR 120 or STB 125, picking up where the user stopped watching at the first DRV 120. Indexing logic 310 may be configured to store information relating to multi-room DVR viewing in the index, such as location identifiers relating to where the content was viewed, percentages of time viewed in each location, etc. The content of an exemplary index is set forth below in FIG. 4.

Index serving logic 320 may include logic configured to transmit the index information to service provider 140 via network 160. In one implementation, index serving logic 320 may periodically transmit the index to service provider 140, while in other implementations, index serving logic 320 may transmit the index to service provider 140 upon a change in the content stored thereon. For example, when a new recording is made by DVR 120-1, indexing logic 310 may extract and store information about the recording in the index, and index serving logic 320 may transmit the updated index to service provider 140. In one implementation, only the added or modified information is transmitted to service provider 140.

Content serving logic 330 may include logic configured to receive a content request from a device (e.g., STB 125, user device 150, and/d another DVR 120) and transmit the requested content via network 160. As described briefly above, in some implementations, devices 120, 125, and/or 150 may communicate via a local network connected to network 160. For example, as will be described above, DVR 120 may be configured to receive a request for content stored on DVR 120. Content serving logic 330 may, in response to the request, provide the requested content via network 160 (or the suitable local network (not shown)). In one implementation, the content serving logic 330 may stream the requested content via network 160.

FIG. 4 illustrates a structure of an exemplary index 400 for storing content information in DVR 120. Index 400 may be stored in storage device 250. Referring to FIG. 4, index 400 may include a number of content entries 405-1 to 405-4 (collectively "entries 405" or individually "entry 405"). Each entry 405 in index 400 corresponds to a content item stored by content storage logic 300. Although content stored on a single DVR is depicted in index 400, as will be described below in relation to FIG. 5, a similar index (e.g., an aggregated index) may include information relating to content stored on a number of DVRs, such as DVRs 120-1 and 120-2. For example, index 400 may be stored on a remote, networked device associated with service provider 140. As described herein, related or associated DVRs 120 may be referred to as "linked DVRs."

In an exemplary embodiment, each content entry 405 may include a DVR identifier field 410, an addressing information field 415, a content type field 420, a content name field 425, a content title field 430, a content description field 435, a content date field 440, and a status field 445. As described above, indexing logic 310 may capture and store information relating to the content stored by content storage logic 300. Although described herein as explicit index fields, it should be understood that index 400 may include more or fewer fields. Moreover, some of fields 410-440 may include a plurality of subfields. For example, status field 440 may include one or more subfields that include information relating to the duration of a prior watching, locations of a viewing stoppage, etc.

Referring to FIG. 4, DVR identifier field 410 may include an identifier associated with a DVR 120 that stores the content. The information in DVR identifier field 410 may enable content entries in an aggregated index to accurately identify the DVR 120 that stores or hosts the associated content item.

Addressing information field 415 may include information corresponding to an address, e.g., a file structure or memory address associated with the content item on DVR 120. For example, sections listed in field 415 may correspond to memory sector values, address pointer values, uniform resource identifiers (URIs), uniform resource locators (URLs), etc. Content type field 420 may include information relating to a type of content associated with the entry. Content types may include television show, movie, PPV, VOD, etc.

Content name field 425 may include information relating to a name associated with the stored content item. For a television show content item, content name field 425 may include the name of the television show. Content title field 430 may include information relating to a title associated with the stored content item. For a television show content item, content title field 430 may include the title of the episode. For a movie content item, content title field 430 may include the title of the movie. Content description field 435 may include a brief description or synopsis of the stored content item. In one implementation consistent with aspects described herein, content name field 425, content title field 430, and content description field 430 may be extracted from program guide information received periodically from service provider 140.

Content date field 440 may include information relating to the date on which the stored content item was recorded or received. For example, when the content item is a recorded television show, content date field 440 may include the date on which the television show was broadcast. When the content item is received (e.g., downloaded video or music), content date field 440 may include the date on which the content was received from service provider 140.

Status field 445 may include information relating to a viewing status of the content item. For example, status field 445 may include a value indicative of whether the content item has been watched, is has not been watched, or has been partially watched. In one implementation, status field 445 may include a position subfield that includes a value or information representative of the position in the content item for which viewing was suspended when the status field indicates that the content item has been partially watched. This may enable a user to continue viewing the content item at the position that viewing was previously suspended.

Figure 5:
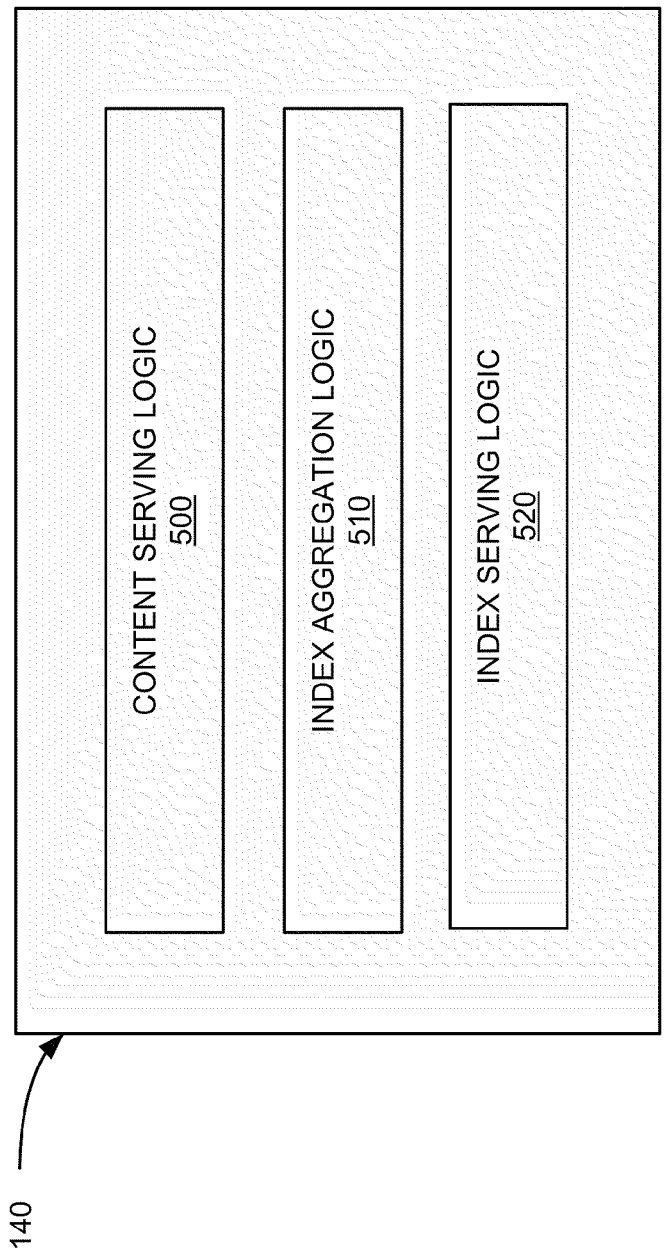
FIG. 5 illustrates an exemplary functional block diagram of components implemented in the service provider of FIG. 1.

FIG. 5 is an exemplary functional block diagram of components implemented in service provider 140 of FIG. 1. In an exemplary implementation, all or some of the components illustrated in FIG. 5 may be stored in memory 230. For example, referring to FIG. 5, memory 230 may include content serving logic 500, index aggregation logic 510, and index serving logic 520. In addition, various logic components illustrated in FIG. 5 may be implemented by processing logic 220 executing one or more programs stored in memory 230. In some implementations, one or more components of FIG. 5 may be implemented in other devices, such as DVRs 120, STB 125, or TV 110.

Content serving logic 500 may include logic configured to provide information/content to DVRs 120 and/or STB 125 via network 160. For example, content serving logic 500 may be configured to transmit program guide information, program data (e.g., television programming data), requested video content (such as VOD content), Internet-related content, etc., to DVRs 120 and/or STB 125.

Index aggregation logic 510 may include logic configured to receive the index information from linked DVRs 120 (e.g., DVRs associated with a particular user or user account). Index aggregating logic 510 may be further configured to aggregate the received index information to generate an aggregated index that includes information for content stored on all linked DVRs 120. As described above in FIG. 4, entries in the indices that together make up the aggregated index may include identifiers indicating the DVR 120 or other device that is storing the associated content.

Index serving logic 520 may include logic configured to receive a request for the aggregated index from DVRs 120, STB 125, and/or user device 150 via network 160. Responsive to the request, index serving logic 520 may be configured to transmit the aggregated index to the requesting device via network 160. In one implementation, index serving logic 520 may periodically transmit the aggregated index to all linked devices (e.g., DVRs 120, STB 125, and/or user device 150). For example, STB 125 may request the aggregated index from service provider 140 in response to a user activation of a content browsing interface. In response to the request, index serving logic 520 may transmit the aggregated index to STB. In one implementation, only the added or modified portions of the aggregated index may be transmitted to service provider.

Figure 6:
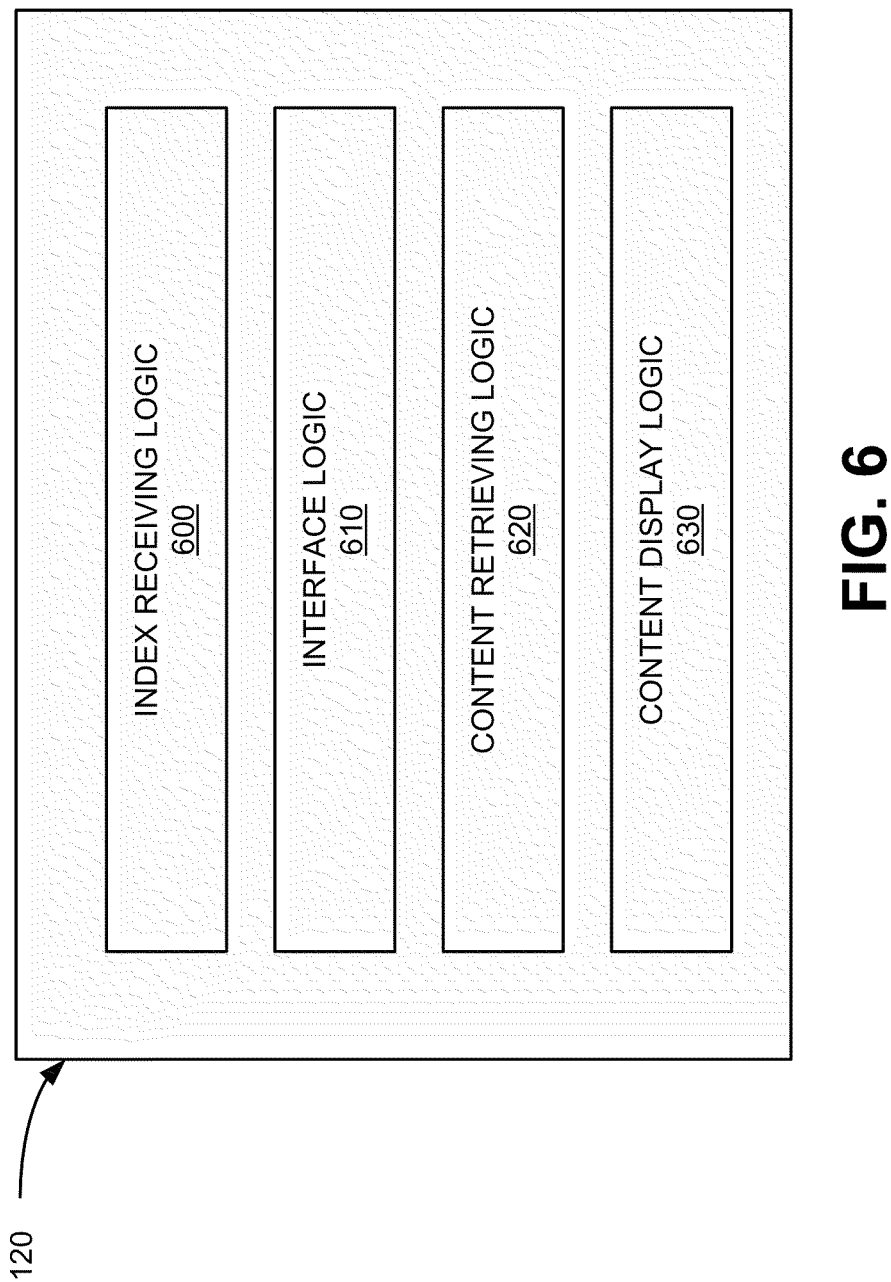
FIG. 6 illustrates an exemplary functional block diagram of components implemented in the STB of FIG. 1

FIG. 6 is an exemplary functional block diagram of components implemented in STB 125 of FIG. 1. In an exemplary implementation, all or some of the components illustrated in FIG. 6 may be stored in memory 230. For example, referring to FIG. 6, memory 230 may include index receiving logic 600, interface logic 610, content retrieving logic 620, and content display logic 630. In addition, various logic components illustrated in FIG. 6 may be implemented by processing logic 220 executing one or more programs stored in memory 230. In some implementations, one or more components of FIG. 6 may be implemented in other devices, such as DVRs 120. For example, DVRs 120 may browse/receive content from other DVRs 120.

Index receiving logic 600 may include logic configured to receive the aggregated index from service provider 140 via network 160. As described above, index receiving logic 600 may receive the aggregated index in an unsolicited manner from service provider 140, while in other implementations, index receiving logic 600 may request the aggregated index information, such as in response to a user content browse command. The received aggregated index may be stored in main memory 230 of STB 125.

Figure 7:
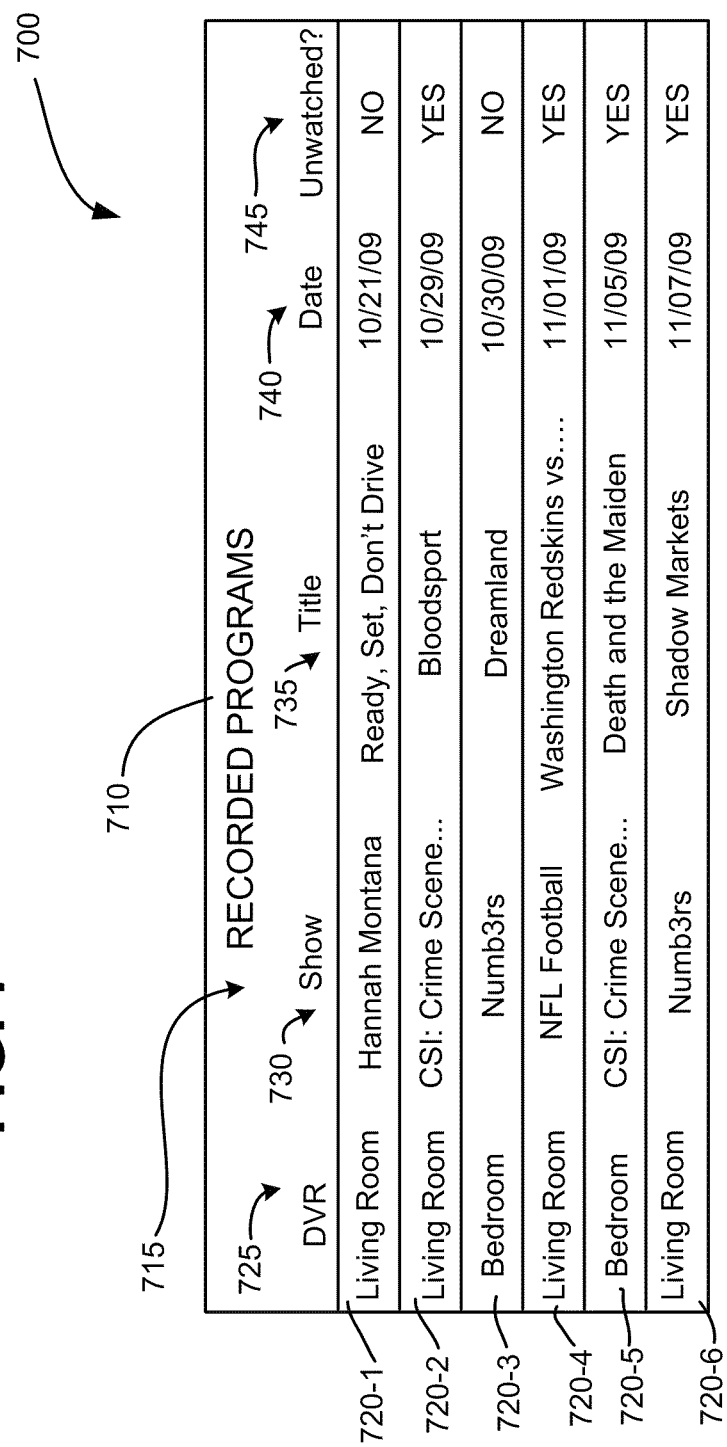
FIGS. 7, 8A, and 8B are exemplary user interfaces provided by the logic components illustrated in FIG. 6.
Figure 8:
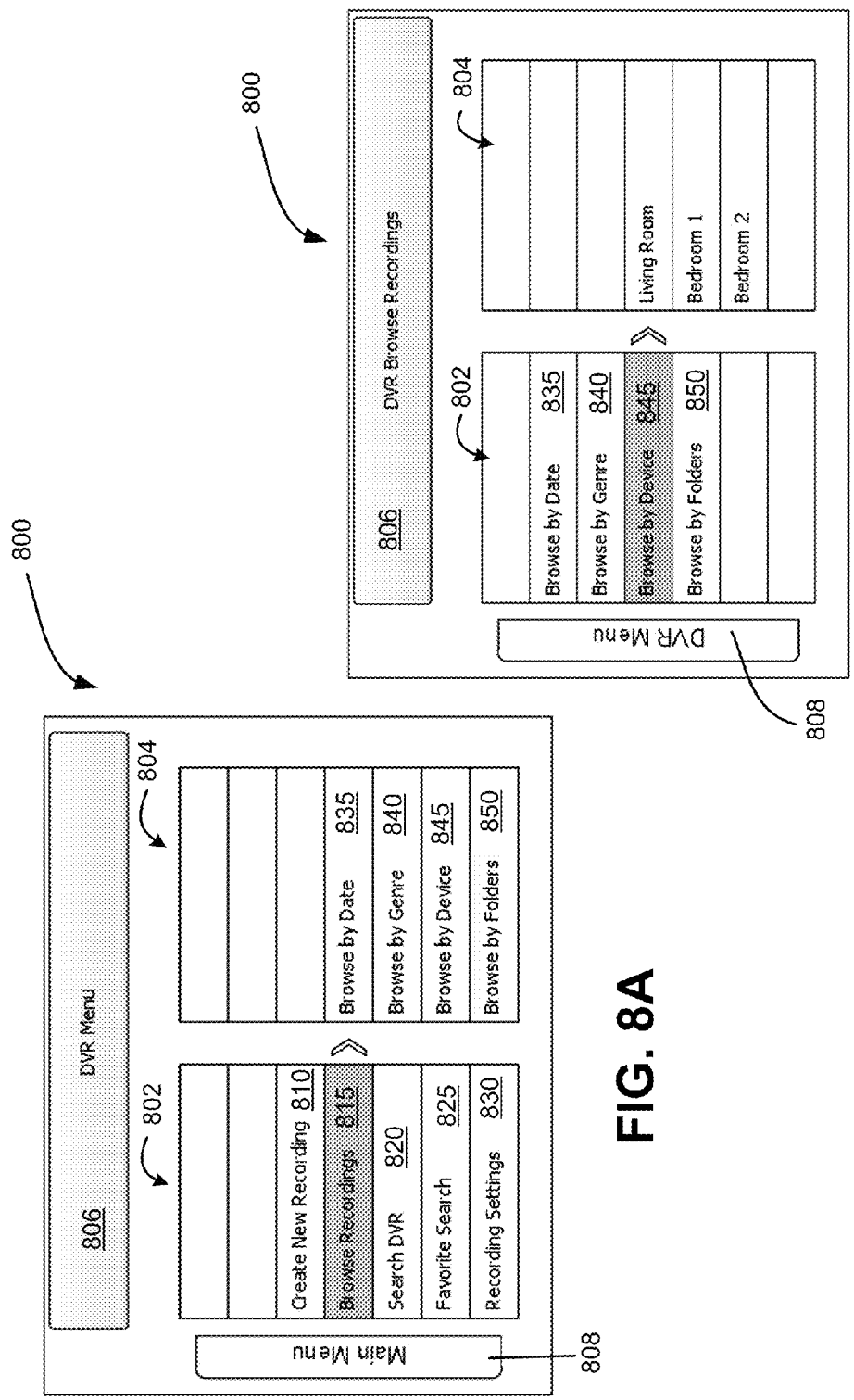

Interface logic 610 may include logic configured to provide a user with an interface to view and/or navigate content stored on multiple DVRs 120. For example, interface logic 610 may provide a graphical user interface (GUI) that allows a user to view information obtained from the aggregated index relating to the content stored on multiple DVRs 120. The GUI provided by interface logic 610 may also allow a user to browse the stored index based on a variety of filters or search parameters, such as type, genre, date, name, specific DVR device, etc. In one implementation, as depicted in FIG. 7, the GUI provided by interface logic 610 may include a recorded programs screen that includes a unified listing of content recorded or stored on DVRs 120. In other implementations, as depicted in FIGS. 8A and 8B, the GUI provided by interface logic 610 may include a menu-driven interface that enables a user to "drill down" into the available content based on user-selected filters or search criteria. Interface logic 610 may be configured to receive a user selection of content stored on one of DVRs 120 for viewing/displaying.

Content retrieving logic 620 may include logic configured to retrieve the user-selected content for display/viewing/playback. For example, in response to a selection/command received by interface logic 610, content retrieving logic 620 may retrieve a corresponding entry in the aggregated index and determine a location of the selected content based on the aggregated index entry. In some instances, the selected content may be stored locally in storage device 250, while in other instances, the selected content may be stored on a remote DVR 120 connected via network 160 (or a local network). Location/addressing information regarding the content (e.g., memory addressing, etc.) may be included in the aggregated index provided by service provider 140. Content retrieving logic 620 may use the location information regarding the selected content to retrieve the selected content for viewing. In one implementation, the DVR 120 associated with the selected content may stream the requested content to content retrieving logic 620.

Content display logic 630 may include logic configured to output the retrieved content for viewing by the user. In one implementation, content display logic 630 may output the selected content to a television 110. In other implementations, content display logic 630 may be configured to output the selected content to user device 150, e.g., by streaming or other suitable mechanisms.

Although illustrated as part of DVRs 120, STB 125, or televisions 110, in an alternative implementation, index receiving logic 600 may include or may be associated with a memory structure remote from a respective DVR 120, STB 125, or television 110, such as a remote database, web server, or the like. For example, the memory structure may be stored at a remote server configured to store the aggregated index.

FIG. 7 illustrates a diagram of an exemplary user interface 700 capable of being generated by television 110, DVRs 120, STB 125, and/or service provider 140 (e.g., and displayed via television 110 or user device 150). User interface 700 may be generated by interface logic 610 and may provide information regarding available content stored on any of linked DVRs 120-1 and 120-2. The user interface depicted in FIG. 7 may include a graphical user interface (GUI) or a non-graphical user interface, such as a text-based interface. User interface 700 may provide information to users via a customized interface (e.g., a proprietary interface) and/or other types of interfaces (e.g., a browser-based interface, a television interface, etc.). User interface 700 may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., output device 270).

As illustrated in FIG. 7, user interface 700 may include a recorded programs screen 710. Recorded programs screen 710 may include a listing 715 of content recorded and available from all linked DVRs 120. As described above, the aggregated index provided by service provider 140 may include the information used by interface logic 610 to generate interface 700. As illustrated, listing 715 may include a number of content entries 720-1 to 720-6 (individually "content entry 720" and collectively "content entries 720"), with each content entry including information relating to an available content item.

More specifically, each content entry 720 may include a number of textual and/or graphical elements, including a DVR identifier 725, a show name 730, an episode title 735, a recording date 740, and an unwatched indicator 745. Consistent with implementations described herein, DVR identifier 725 may be a graphical or textual indicator representative of a DVR 120 on which the content item is stored. For example, as illustrated in FIG. 7, DVR identifier 725 may include a name assigned to the DVR on which the content item is stored.

Show name 730 and episode title 735 may include name and episode information regarding the available content item. Recording date 740 may indicate the date on which the recording was made. Unwatched indicator 745 may include a graphical or textual indicator that indicates whether or not the content item has been watched. In some implementations, the unwatched indicator 745 may be graphically incorporated into other elements of the content entries, such as changing a text color of the entry or portions of the entry, providing an indicator icon, such as an asterisk, to indicate the unwatched status of the content item, etc. In one implementation, a green color may represent a previously watched content item, a yellow color may represent a partially watched content item, and a red color may represent an unwatched content item.

In other implementations, the graphical indicator may represent whether the content item was partially watched, or the DVR device on which the content item was previously watched. During generation or display of interface 700, interface logic 610 may retrieve status information from the aggregated index provided by service provider 140.

Although exemplary interface 700 relates to a listing 715 of recorded or stored content, similar interfaces may be provided for displaying or presenting any combination of information retrieved from the aggregated index. FIGS. 8A and 8B illustrate an exemplary user interface 800 capable of being generated by DVRs 120, STB 125, television 110, user device 150, and/or service provider 140 (and displayed via television 110 or user device 150). User interface 800 may be generated by interface logic 610 and may include information retrieved from the aggregated index received from service provider 140. As illustrated in FIGS. 8A and 8B, user interface 800 may include a menu-driven interface that enable a user to "drill down" into the available content using various filters.

Referring to FIGS. 8A and 8B, interface 800 may include a two-pane hierarchical structure that includes a parent pane 802 and a child pane 804. Interface 800 may also include a current level indicator 806 and a grandparent tab 808. It should be understood that the elements and components of interface 800 are exemplary only and that interface 800 may include more, fewer, or different elements than those depicted in FIGS. 8A and 8B.

Parent pane 802 may include parent-level interface selections available to the user. Upon selection of a particular parent-level interface selection, interface 800 may display corresponding child-level interface selections in child pane 804. A name associated with parent pane 802 may be provided in current level indicator 806 to provide users with a reference. Grandparent tab 808 may include a name or identifier associated with a hierarchical level above the currently displayed parent pane 802.

Referring to FIG. 8A, parent pane 802 and current level indicator 806 may relate to a DVR menu and grandparent tab 808 may provide access to a main menu. As illustrated in FIG. 8A, the DVR menu parent pane 802 may include the following selection options: a create new recording option 810, a browse recordings option 815, a search DVR option 820, a favorite search option 825, and a recording settings option 830.

Selection of create new recording option 810 may cause interface logic 610 to provide an interface for receiving information regarding a new recording, such as program name information, time/date information, saving priority information, etc. In one implementation, the interface for receiving information regarding a new recording may include a program guide information interface that displays upcoming programming. The program guide information may be received periodically from service provider 140.

Selection of browse recordings option 815 may cause interface logic 610 to provide an interface that enables the user to browse or navigate through content available for viewing. As described above, interface logic 610 may provide such an interface using an aggregated index that includes information relating to content stored on a number of linked devices, such as DVRs 120-1 and 120-2. The aggregated index may be received from service provider 140 via network 160.

Selection of search DVR option 820 may cause interface logic 610 to provide an interface that enables the user to search for available content. Similar to browse recordings option 815, consistent with implementations described herein, search DVR option 820 may enable a user to search for content across all of the linked DVRs 120.

Selection of favorite search option 825 may cause interface logic 610 to provide an interface that enables the user to search for content meeting predefined favorite parameters, such as show name, actor name, keywords, etc. In addition, selection of favorite search option 825 may cause interface logic 610 to provide an interface that enables the user to set up new favorite searches.

Selection of recording settings option 830 may cause interface logic 610 to provide an interface that enables the user to view and/or modify various recording settings associated with DVR 120, such as default save times/priorities, etc.

In the example of FIG. 8A, assume that the user has selected browse recordings option 815 in parent pane 802. For example, a user may navigate and select browse recordings option 815 using remote control 130. In response to the user selection, interface logic 610 may cause child pane 804 to display a number of browse recordings options. As illustrated in FIG. 8A, the browse recordings child pane 804 may include a browse by date option 835, a browse by genre option 840, a browse by device option 845, and a browse by folders option 850.

Selection of browse by date option 835 may cause interface logic 610 to provide an interface for listing available content in a date-sorted manner. For example, selection of browse by date option 835 may cause interface logic 610 to display interface 700 described above. In other implementations, selection of browse by date option 835 may cause interface logic 610 to move browse recordings child pane 804 to parent pane 802 and populate child pane 804 with a date-sorted listing of the available content, using information included in the aggregated index.

Selection of browse by genre option 840 may cause interface logic 610 to provide an interface that enables the user to search for available content based on a genre associated with the content. Genre information for the available content may be included in the aggregated index.

Selection of browse by device option 845 may cause interface logic 610 to provide an interface that enables the user to search for available content based on a device that is storing the content. As described above, information regarding the device that is storing each content item, including addressing or location information, may be included in the aggregated index.

Selection of browse by folders option 850 may cause interface logic 610 to provide an interface that enables the user to search for available content based on folders associated with the available content. For example, in one implementation, available content may be grouped together based on various criteria, such as series name, keywords, etc. In other implementations, folders may be created by users to group their recordings. For example, a "Dad's" folder may include content that a user (e.g., "Dad") has either recorded/stored themselves or content that another user recorded, but that the user wants to view. Folders associated with the groupings may provide users with an easy way to keep content organized. Folder information regarding available content may be included in the aggregated index or, alternatively, may be selectively maintained on an individual STB 125 or DVR 120 accessing the content.

In the example of FIG. 8B, assume that the user has selected browse by device option 845 in child pane 804. For example, a user may navigate and select browse recordings option 815 using remote control 130. In response to the user selection, interface logic 610 may move browse recordings child pane 804 to parent pane 802 and populate child pane 804 with a listing of available DVR devices 120. In one implementation, the listing of available DVR devices 120 may be based on information included in the aggregated index. As shown in FIG. 8B, child pane 802 may include a listing of three DVR devices 120 with available content: Living Room, Bedroom 1, and Bedroom 2. Although not displayed in FIGS. 8A-8B, selection of one of the available DVR devices in child pane 804 may cause interface logic 610 to present a listing of content available on the selected DVR device. For example, the content of child pane 804 listing available DVR devices 120 may be moved to parent pane 802 and child pane 804 may be populated with a listing of available content. In one implementation, the listing may be date-sorted and may include the names or titles associated with the available content.

Figure 9:
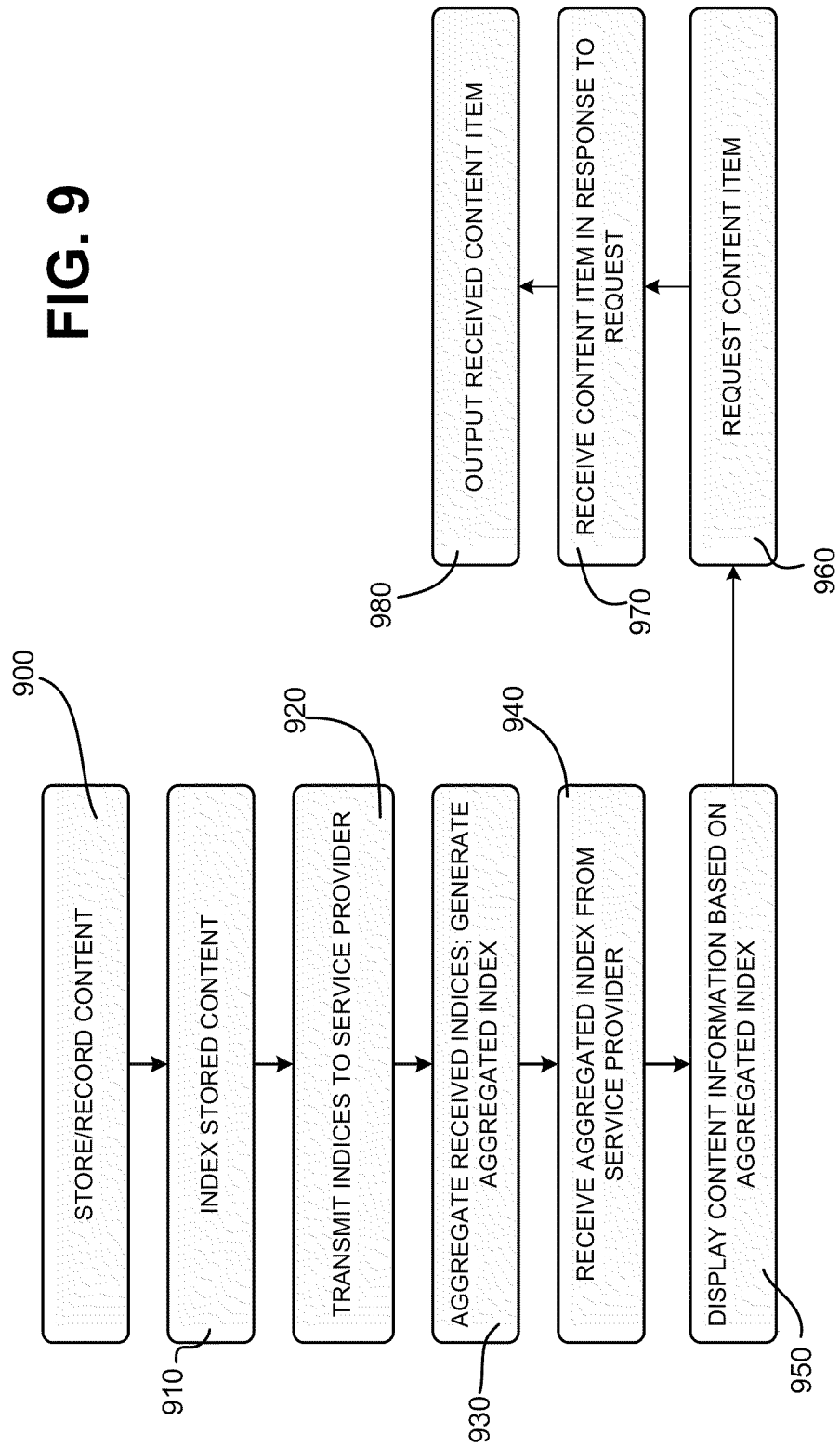
FIG. 9 is a flow diagram illustrating exemplary processing for providing enhanced multi-room viewing of content items.

FIG. 9 is a flow diagram illustrating exemplary processing for providing enhanced multi-room viewing of content items. Processing may begin with DVRs 120 storing or recording content (block 900). For example, as described above, content storage logic 300 may record television programming based on received user requests or an established recording schedule. The recorded content may be stored, for example, on storage device 250 associated with the respective DVR 120.

DVRs 120 may index the stored content (block 910). For example, indexing logic 310 may extract information regarding the stored content and store the extracted information in an index. Exemplary types of information in the index may include content type, name, title, recording date, and viewing status, as illustrated in index 400 (FIG. 4). As described above, the index may further include an identifier indicating the DVR 120 that stored the content and addressing information relating to content addresses or location within respective DVRs 120.

DVRs 120 may transmit their respective indices to service provider 140 via network 160 (block 920). For example, index service logic 320 may transmit the index to index aggregation logic 510 in service provider 140 via network 160. Service provider 140 may aggregate the received indices to generate an aggregated index (block 930). For example, index aggregation logic 510 may receive the content indices from linked or associated DVRs 120 and may combine the indices to form the aggregated index that includes information for content stored on all connected or linked DVRs 120.

STB 125 and/or DVR 120 associated with the linked DVRs may receive the aggregated index from service provider 140 (block 940). For example, STB 125 may transmit a request for the aggregated index to service provider 140 via network 160. In one implementation, the request may be received as a user command to view available content. Service provider 140 may transmit the aggregated index in response to the request (block 940). As described above, entries in the aggregated index may include content information, viewing status information, and location/addressing information.

STB 125 and/or DVR 120 may display content information to the user based on the received aggregated index (block 950). For example, interface logic 610 may provide a GUI for providing content information to the user. The provided GUI may allow the user to filter or otherwise sort the available content based on various criteria.

STB 125 may request a content item from DVR 120 associated with the displayed content information (block 960). For example, interface logic 610 may receive a user request for a content item. Content retrieving logic 620 may identify DVR 120 associated with the requested content item based on information in the aggregated index and may transmit a request for the content item to the identified DVR 120. STB 125 may receive the requested content item from the identified DVR 120 (block 970). For example, content retrieving logic 620 may receive a media stream including the requested content item from the identified DVR 120. STB 125 may output the received content (block 980). For example, content display logic 630 may output the content item via output device 270.

Implementations described herein relate to devices, methods, and systems for facilitating the storing and viewing of television content across multiple devices. For example, a number of DVR devices 120 may include components configured to store content and to index the content. The DVR devices 120 may transmit the content indices to service provider 140 for aggregation. The service provider may aggregate the indices into an aggregated index and may provide the aggregated index to a requesting device, such as an associated STB 125, another DVR 120, or a user device 150 (e.g., a cellular phone, etc.).

A user at the requesting device may be provided with a unified listing of content available on all associated devices, based on the received aggregated index. A user may select a content item for viewing and the requesting device may extract location information for the content item from the aggregated index. A request for the selected content item may be transmitted to the DVR device 120 storing the content and the requested content may be streamed to the requesting device.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, although the above description is primarily made with reference to television content, other types of content may be stored and provided in a similar manner, such as application content, widget content, on-demand content, photo content, music content, and movie content.

Further, while series of blocks have been described with respect to FIG. 9, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    requesting aggregated index information relating to media content stored on at least two digital video recorder (DVR) devices;
    receiving the aggregated index information in response to the request,
    wherein the aggregated index information includes a number of content entries, each entry including location information identifying a DVR device on which the associated media content is stored, content title information, content date information, and viewing status information; and
    displaying a listing of the media content based on the aggregated index information,
    wherein displaying the listing further comprises:
        providing a user interface for presenting information associated with the media content stored on the at least two DVR devices,
        wherein the user interface provides an indication to the user of the viewing status information associated with the media content,
        wherein the viewing status information associated with the media content includes a partially watched indicator that indicates that the associated content item has been partially watched, when the associated content item has been partially, but not completely watched, and
        wherein the viewing status information in the aggregate index information includes information relating to a relative numerical position within the associated content item at which the viewing was suspended.

2. The method of claim 1, wherein the at least two DVR devices are associated with a user account, and
    wherein the method is performed by one of the at least two DVR devices or another device associated with the user account.

3. The method of claim 2, wherein the method is performed by a set-top box (STB) associated with the user account.

4. The method of claim 1, wherein the aggregated index information comprises first index information from a first one of the at least two DVR devices and second index information from a second one of the at least two DVR devices.

5. The method of claim 1, further comprising:
    requesting the aggregated index information from a service provider associated with the at least two DVR devices.

6. The method of claim 1, further comprising:
    allowing the user to select a particular media item via the user interface for viewing.

7. The method of claim 1, wherein the listing comprises a menu-driven interface for viewing the information associated with the media content stored on the least two DVR devices.

8. The method of claim 1, further comprising:
    receiving a user request to view a particular media item from the listing;
    identifying a DVR device that stores the particular media item based on the aggregated index information;
    transmitting a request for the particular media item to the identified DVR device;
    receiving the particular media item from the identified DVR device; and
    outputting the particular media item for viewing.

9. A device, comprising:
    a communication interface configured to receive content information and an aggregated index relating to media content stored on at least two digital video recorder (DVR) devices,
    wherein the device comprises one of the at least two DVR devices or another device associated with a user account,
    wherein the aggregated index includes a number of content entries, with each of the content entries including location information identifying a DVR device on which the associated media content is stored, content title information, content date information, and viewing status information;
    a memory to store the received aggregated index;
    an output interface for displaying visual information to a user; and
    logic to:
        receive the aggregated index via the communication interface;
        store the aggregated index in the memory; and
        output a listing of the media content based on the aggregated index via the output interface,
        wherein the output interface provides an indication to the user of the viewing status information associated with the media content,
        wherein the indication includes a partially watched indicator that indicates that the associated media content item has been partially watched, when the associated content item has been partially, but not completely watched, and
        wherein the viewing status information in the aggregate index information includes information relating to a relative numerical position within the associated content item at which the viewing was suspended.

10. The device of claim 9, wherein the aggregated index comprises first index information from a first one of the at least two DVR devices combined with second index information from a second one of the at least two DVR devices.

11. The device of claim 9, wherein the viewing status information comprises information indicating that the associated content item has been partially watched.

12. The device of claim 11, wherein the logic is further configured to:

provide, via the output interface, a user interface displaying information associated with the media content stored on the at least two DVR devices,
wherein the user interface provides an indication of the viewing status information associated with the media content, and
wherein the user interface allows a user to select a particular media item for viewing.

13. The device of claim 9, wherein the logic is further configured to:
receive a user request to view a particular media item from the listing;
identify a DVR device that stores the particular media item based on the aggregated index;
transmit a request for the particular media item to the identified DVR device via the communication interface;
receive the particular media item from the identified DVR device; and
output the particular media item for viewing via the output interface.

14. A non-transitory computer-readable medium having stored thereon sequences of instructions which, when executed by at least one processor, cause the at least one processor to:
request aggregated index information relating to media content stored on the at least two digital video recorder (DVR) devices;
receive the aggregated index information in response to the request,
wherein the aggregated index information includes a number of content entries, each including location information identifying a DVR device on which the associated media content is stored, content title information, content date information, and viewing status information; and
display a unified listing of the media content based on the aggregated index information,
wherein the unified listing further comprises:
a user interface for presenting information associated with the media content stored on the at least two DVR devices,
wherein the user interface provides an indication to the user of the viewing status information associated with the media content,
wherein the viewing status information associated with the media content includes a partially watched indicator that indicates that the associated content item has been partially watched, when the associated content item has been partially, but not completely watched and
wherein the viewing status information in the aggregate index information includes information relating to a relative numerical position within the associated content item at which the viewing was suspended.

15. A system, comprising:
a first digital video recorder (DVR) device for storing first media content;
a second DVR device for storing second media content; and
a set-top box (STB) device for outputting a selected media item from the first media content or the second media content,
wherein a service provider is connected to the first DVR device, the second DVR device, and the STB device via a network,
wherein the first DVR device, the second DVR device, and the STB device are each associated with a user account,
wherein the first DVR device is configured to index the first media content and transmit the index to the service provider via the network,
wherein the second DVR is configured to index the second media content and transmit the index to the service provider via the network,
wherein the service provider is configured to generate an aggregated index based on the index of the first media and the index of the second media,
wherein the aggregated index includes content title information, content date information, and viewing status information for the first media content and the second media content, wherein the viewing status information in the aggregated index information includes information relating to a relative numerical position within the associated content item at which the viewing was suspended,
wherein the STB device is configured to receive the aggregated index from the service provider and output an interface that includes a listing of media content that includes the first media content and the second media content based on the aggregated index, and
wherein the listing of media content includes the content title information, the content date information, and the viewing status information.

16. The system of claim 15, wherein the STB device is further configured to
receive a user request to view the selected media item from the listing;
identify a DVR device that stores the selected media item based on the aggregated index;
transmit a request for the selected media item to the identified DVR device;
receive the selected media item from the identified DVR device; and
output the selected media item for viewing.

* * * * *